Aug. 17, 1948.  P. W. GAENSSLE  2,447,244
BRAKE ARRANGEMENT
Filed Nov. 14, 1944  2 Sheets-Sheet 1
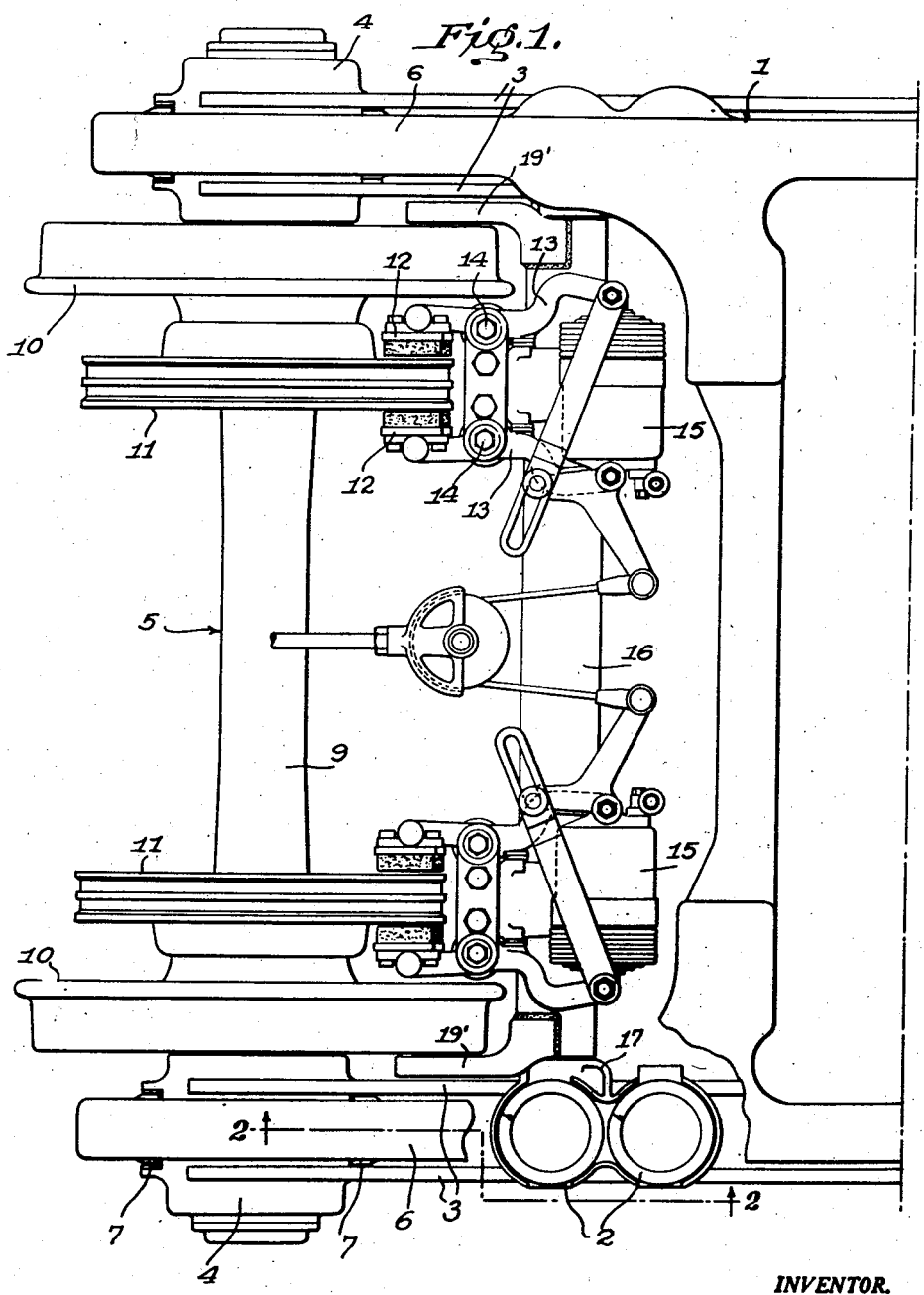
INVENTOR.
Paul W. Gaenssle
BY
ATTORNEY

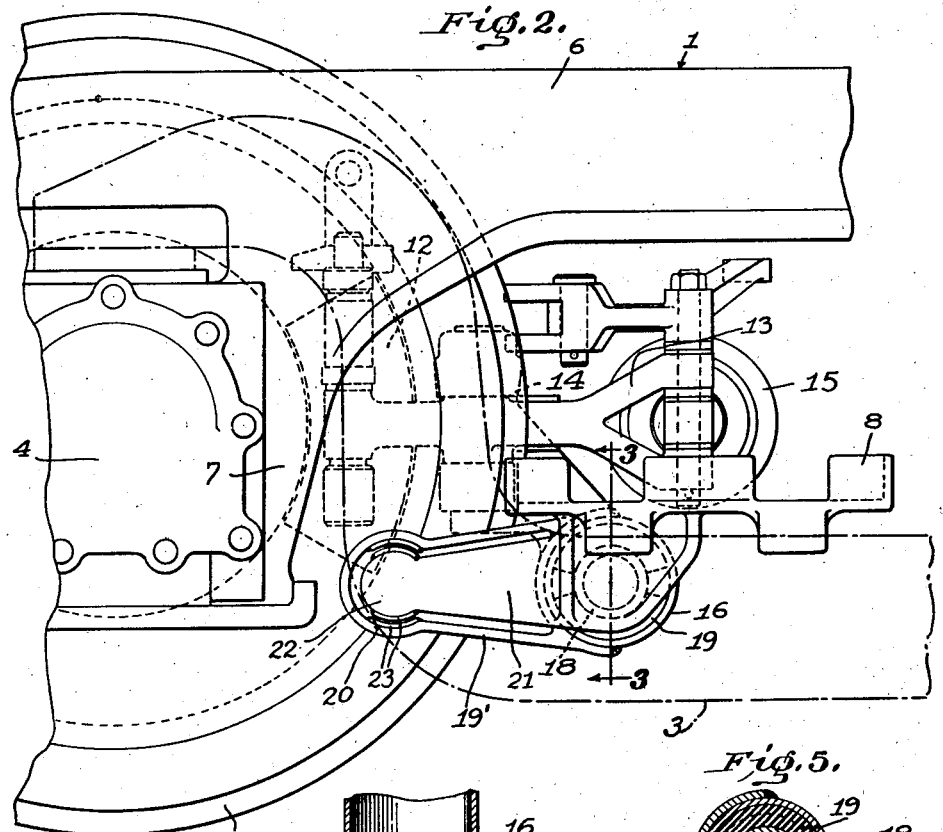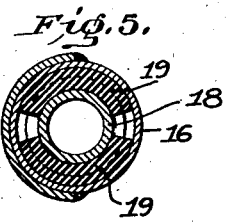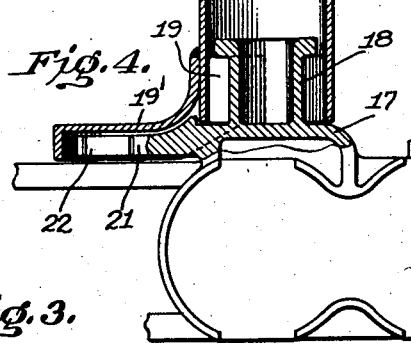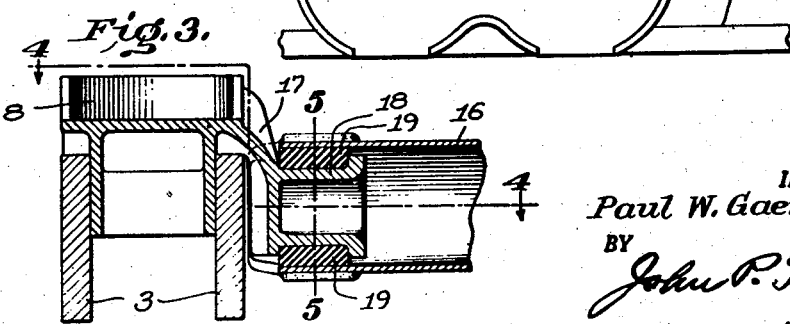

Patented Aug. 17, 1948

2,447,244

UNITED STATES PATENT OFFICE 2,447,244

BRAKE ARRANGEMENT

Paul W. Gaenssle, Grosse Pointe Farms, Mich., assignor to The Budd Company, Philadelphia, Pa., a corporation of Pennsylvania Application November 14, 1944, Serial No. 563,338

2 Claims. (Cl. 188—59)

The invention relates to brake mechanisms and particularly to such mechanism associated with a railway truck.

The invention is particularly concerned with the support for the non-rotary elements or stators of the brake associated with a wheel and axle assembly of the truck and the connection of such support to longitudinal side members of the truck, such as equalizers, supported at the ends of the wheel and axle assembly to partake in the movements thereof.

It is an object of the invention to provide a very simple and compact brake support and one which may readily be connected to the side members or equalizers not only to support it yieldably, but also to permit it to transmit the braking torque to the equalizers and with a minimum of parts.

It is another object of the invention to so transmit the torque to the equalizers as to avoid substantial bending or torsional strains on the equalizers due to the transmission of the braking torque thereto.

Ease of assembly and of manufacture of the support is a further object of the invention.

Other and further objects and advantages will become apparent from the following detailed description when read in connection with the drawings forming a part of this specification.

In the drawings:

Fig. 1 is a plan view of one-half of a railway truck equipped with the invention;

Fig. 2 is a fragmentary side elevation on an enlarged scale showing the relation of the brake support to the adjacent wheel and axle assembly and the side members of the truck;

Fig. 3 is a detail sectional view taken substantially along the line 3—3 of Fig. 2;

Fig. 4 is a fragmentary plan view, parts being shown in section, the view being taken substantially along the line 4—4 of Fig. 3, and Fig. 5 is a detail sectional view taken substantially on the line 5—5 of Fig. 3.

The invention is shown applied to a railway truck having the usual frame 1 supported through coil springs, as 2 (omitted for the sake of clarity in Fig. 2), from the equalizer bars 3, in turn supported on top of the journal boxes 4 at the ends of the wheel and axle assembly, generally designated 5. The side members 6 of the truck frame are guided for vertical movement with respect to the wheel and axle assembly, by the usual pedestals 7.

In the present embodiment, the equalizer bars at the opposite sides of the truck are arranged in pairs, but it will be understood that the invention is equally applicable to trucks having single equalizer bars.

The springs 2 are seated on the equalizer bars through spring seats 8 which may be of usual construction, except as modified for the connection of the equalizers to the brake support as will be hereinafter described, and secured in usual manner to the equalizer bars.

The wheel and axle assembly further comprises the axle 9 carrying the wheels 10 with each of which is associated for rotation therewith, a brake rotor or disc 11. Each of the rotors 11 has associated therewith a pair of brake stators or shoes 12, which are carried in known manner by a pair of brake levers 13, pivoted at 14, and actuated by a cylinder 15, and also by any suitable manual actuating means, not forming a part of this invention, but shown herein as comprising lever-link mechanism associated with each cylinder, the two opposed such mechanisms being operated by an equalizing means.

The support for the stators and their actuating means which form the subject of this invention comprises a straight transversely extending tubular member 16 disposed adjacent the periphery of the wheels of the adjacent wheel and axle assembly and terminating at its ends just inside the respective equalizer bars 3 at the opposite sides of the truck. It is there connected to the equalizers by a universal joint connection permitting the relative movement of the equalizers without straining the support. The connection is further constructed to transmit the braking torque to the equalizers and to cushion the relative movements of the equalizers and support and also to cushion the support for road shocks in the operation of the truck.

Since the support has its ends disposed longitudinally in the region of the spring seats 8, according to the invention these spring seats are utilized to connect the ends of the support to the equalizers and since the connection is the same at both ends only one connection will be described herein.

The equalizer seat is modified from the usual form by having an inwardly and downwardly extending bracket, as 17, formed integrally therewith, this bracket having a hollow stud 18 projecting laterally therefrom and extending into the adjacent end of the tubular support 16. The hollow stud is formed with a reduced portion between its ends, and in this reduced portion are seated upper and lower cushioning means 19, such as rubber segments, the outer faces of which engage the inner wall of the tubular end of support 16. These segments are preferably under some compression. This yielding joint cushions the road shocks and also allows universal movement between the equalizer and the tubular brake support.

To transmit the braking torque to the equalizer, there is provided a hollow arm 19' secured as by arc welding to the adjacent end of the support 16, this arm extending substantially at right angles to the axis of the member 16 and is shown flanking the adacent equalizer bar 3 and forming therewith a substantially closed pocket. The end of this arm is formed with a part-spherical bearing 20.

The spring seat 8 is further formed with an arm 21 which projects into the pocket above described and has a spherical end portion 22 having a loose fit within the spherical bearing 20. The top and bottom walls of spherical bearing end of the arm 19' thus form abutments, with which the top and bottom faces of the end portion of the arm 21 may engage to take the braking torque, for either direction of rotation of the wheels associated with the adjacent axle.

It will be noted that the torque transmitting connections 20, 22 between the brake support 16 and the associated equalizers, through the spring seats 8 forming in effect rigid parts of the equalizers, is disposed substantially in the vertical transverse plane in which the resultant tangential drag or resultant torque force acts on the shoes. This has the effect that the torque is transmitted to the equalizers through the connections 20, 22 in a direct up or down direction, depending upon the direction of rotation of the rotary discs 11. Substantially none of the torque is taken by the rubber cushions 19, so that the latter may be relatively soft and thereby providing better cushioning of the weight of the support.

Since the torque acts on the equalizers in a direct up and down direction, there is less distorting strain on the equalizers or the combined equalizers and associated spring seats, since there is no couple tending to bend these parts in their longitudinal plane. Moreover, since the direct up or down torque force is delivered to the equalizer or its attached spring seat in the region of its upwardly substantially vertically extending portion adjacent the axle, longitudinal bending of the equalizers under the braking torque is still further minimized.

Preferably, to minimize wear, the engaging faces of the arms 19' and 21 may be faced with part-spherical wear plates 23, see Fig. 2.

The loose fit of the spherical ends of the arms is desirable to give the desired freedom of relative movement between the equalizers and the support under the conditions of operation.

While a specific embodiment of the invention has been herein described and in association with a specific form of truck, it will be understood that changes and modifications may be made by those skilled in the art which do not depart from the main features of the invention and such changes and modifications are intended to be covered in the appended claims.

I claim:

1. In a brake arrangement, a wheel and axle assembly, equalizer bars supported from the opposite ends thereof, a brake rotor carried by said assembly, a brake stator for cooperation therewith, a support for said stator comprising a tubular transversely extending member connected at its ends to the respective equalizers, at least one of said connections comprising a laterally extending arm on said tubular member, a similar arm on the adjacent equalizer embraced by said first named arm, said arms having loose pivotal engagement with each other adjacent their ends, and a horizontal stud on the equalizer projecting into the adjacent end of the tubular member, and cushioning means interposed between said stud and tubular member.

2. In a brake arrangement, a wheel and axle assembly, longitudinally extending side members supported from the opposite ends thereof, a brake rotor carried by said assembly, a brake stator for cooperation therewith and a support for said stator comprising a transversely extending member of tubular cross section at least at its ends connected to the respective side members, at least one of said connections comprising a stud carried by the adjacent side member projecting into the adjacent tubular end of said transversely extending member, rubber cushioning means disposed between said stud and said tubular end, and an arm projecting at an angle to the axis of said tubular end and having its end adapted to engage with spaced abutments carried by the adjacent side member.

PAUL W. GAENSSLE.

REFERENCES CITED

The following references are of record in the file of this patent:

UNITED STATES PATENTS

| Number | Name | Date |
|---|---|---|
| 2,253,268 | Eksergian et al. | Aug. 19, 1941 |
| 2,274,860 | Gaenssle | Mar. 3, 1942 |
| 2,334,024 | Nystrom et al. | Nov. 9, 1943 |
| 2,365,460 | Eksergian et al. | Dec. 19, 1944 |
| 2,399,071 | Tack et al. | Apr. 23, 1946 |